May 11, 1965
W. E. NEILAN
3,182,563
HYDRAULIC CYLINDER PISTON
Filed Aug. 19, 1963
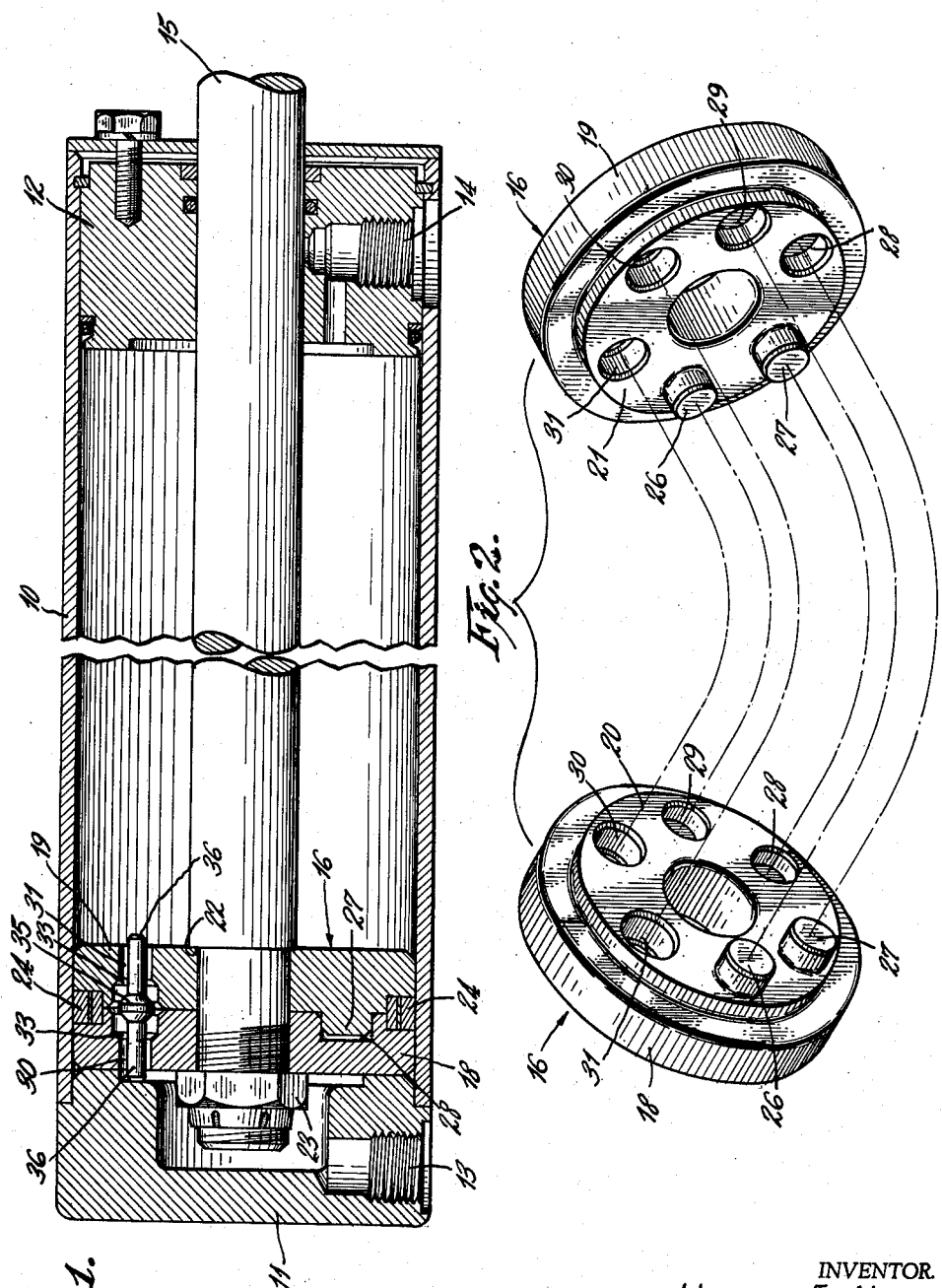
INVENTOR.
WILLIAM E. NEILAN,
BY
ATTORNEYS.

3,182,563
HYDRAULIC CYLINDER PISTON
William E. Neilan, Lafayette, Ind., assignor, by mesne assignments, to Thompson Ramo Wooldridge Inc., Euclid, Ohio, a corporation of Ohio
Filed Aug. 19, 1963, Ser. No. 303,040
8 Claims. (Cl. 91—401)

This invention relates to hydraulic motors of the cylinder-and-piston type and more particularly to an improved form of piston for use in such device.

It has heretofore been proposed to provide the piston of a hydraulic motor with one or more through passages each containing a double-acting check valve which, except when the piston is at the ends of its stroke, prevents flow from the high-pressure side to the low-pressure side of the piston, but which is provided with stems projecting longitudinally beyond the opposite faces of the piston in position to be engaged by one or the other of the cylinder heads, thereby forcing the check valve open and substantially reducing the difference between fluid pressures on opposite sides of the piston. One of the objects of my invention is to produce a piston comprising two elements which can be assembled to provide, alternatively, two, one, or none of such valved through passages.

In carrying out the invention in its preferred form, the piston is formed of two similar disk-like elements adapted to be clamped together in concentric, face-to-face relationship on the piston rod. In their opposed faces, the two elements are peripherally rabbeted to provide an annular groove for the reception of a piston ring. Each element is additionally provided with two axially projecting bosses, with two boss-receiving recesses, and with two through passages, each provided intermediately with a valve seat. The bosses, recesses, and through passages are all located at the same distance from the piston axis and are spaced at equal angular intervals about such axis. In each of the through passages, the valve seat is located at the base of a counterbore having a diameter equal to that of the bosses, so that each boss can be received alternatively in either of the counterbores as well as in either of the recesses of the other element.

The two piston elements as just described are capable of being assembled in any of three relative positions. In the first of such positions, the two bosses of each element are received in the two recesses of the other element, and the two through passages of each element are aligned with the through passages of the other element, to provide two flow-paths through the piston. In the second position, the two bosses of one element are received respectively in a recess and in a through passage of the other element, the other through passages being aligned to provide a single flow-path through the piston. In the third position, the two bosses of each element are received in the two through passages of the other element, and there is no passage extending through the piston.

Further objects and features of the invention will become apparent from the more detailed description which follows and from the accompanying drawing, in which:

FIG. 1 is an axial section through a hydraulic motor of the piston and cylinder type;

FIG. 2 is an exploded isometric view illustrating the piston elements in opposed but separated condition.

The motor shown in FIG. 1 comprises a cylinder 10 closed at its ends by heads 11 and 12 provided respectively with ports 13 and 14 through which liquid is admitted to or withdrawn from the cylinder. One of the heads, shown as the head 12, slidably receives a piston rod 15 carrying a piston designated in its entirety by the reference numeral 16.

As previously indicated, the piston 16 comprises two identical disk-like elements identified by the reference numerals 18 and 19, such elements being clamped together, with their opposite faces 20 and 21 in contact, between a shoulder 22 on the piston rod 15 and a nut 23 screw-threadedly mounted on the end of the piston rod. The opposed faces 20 and 21 of the elements 18 and 19 are peripherally rabbeted to provide, when the elements are assembled, an annular groove for the reception of a piston ring 24.

The rabbeted face of each element is provided with a pair of bosses 26 and 27, which project from such face by a distance substantially less than the thickness of the element, and with a pair of recesses 28 and 29 adapted to receive the bosses 26 and 27 of the other element. In addition to the bosses and recesses, each element is provided with through passages 30 and 31, each counterbored from the face 20 or 21 to a diameter and depth permitting reception of a boss. The bottoms of the counterbores are frusto-conical to provide valve seats 33, as shown in FIG. 1. As previously mentioned, the bosses, the recesses, and the through passages are all located at the same distance from the axis of the element and are equally spaced about such axis, the two bosses being adjacent each other, as are also the two recesses and the two through passages.

The two piston elements just described can be assembled in any of three relative positions of rotation about their common axis. FIG. 2 illustrates the two elements swung apart from one such position with no rotation of either element about its axis. As will be apparent from that figure, if the two elements are brought together by reversing the swinging movement without rotating either element about its axis the two bosses 26 and 27 of each element will enter the two recesses 29 and 28, respectively, of the other element, while the two through passages 30 and 31 will be aligned with the two through passages 31 and 30, respectively, of the other element, thus enabling each pair of aligned passages to receive a double-acting check valve such as is shown in FIG. 1. Each of such check valves embodies an intermediate head 35 which can seat, alternatively, against either of the valve seats 33. Valve stems 36 extending oppositely from the head 35 have a length greater than the distance between each valve seat and the adjacent face of the piston.

Except when the piston is near one end of its stroke, any difference between the fluid pressures on opposite sides of the piston will seat each valve head 35 against its seat in one or the other of the elements 18 and 19, thus preventing any flow through the associated passage. With each through passage thus blocked, no fluid can pass through the piston, and admission of fluid to the high-pressure end of the cylinder will force the piston toward the opposite end. When the piston approaches the head at such opposite cylinder-end, the projecting stem 36 of each valve will be engaged by the head, and continuing movement of the piston will cause the valve head to leave its seat to permit flow through the piston, thus reducing the pressure differential to that corresponding to the pressure-drop across the opened flow path or paths through the piston.

Each cylinder head is constructed so that it will be engaged by a projecting valve stem 36 before it is engaged by the piston but so that it will be engaged by the piston before a valve head moved away from its one seat can engage its other seat. As a result, when the piston is at either extreme limit of its stroke, as determined by its engagement with a cylinder head, each valve head will occupy a position intermediate its two valve seats and the associated flow path through the piston will remain open to maintain the reduction in the pressure differential acting on the piston.

As will be obvious, the pressure differential acting on the piston at either end of its stroke will depend, other conditions being the same, upon the number of flow-paths through the piston. With the elements 18 brought together in the relative orientation shown in FIG. 2, two valved flow paths through the piston are provided. If the element 19 is rotated through 60° in a clockwise direction about its axis from the position shown in FIG. 2, the bosses 26 and 27 of each element will be in alignment respectively with the passage 30 and recess 29 of the other element and the two passages 31 will be in alignment with each other. When the two elements, so oriented, are brought together, the bosses 26 will occlude the passages 30 and the aligned passages 31 will provide a single flow-path through the piston.

If the element 19 is rotated in the clockwise direction through 120° from the position shown in FIG. 2, the bosses 26 and 27 of each element will be brought into alignment, respectively, with the pasasges 31 and 30 of the other element; and when the two elements are brought together the bosses of each will enter and occlude both through passages of the other element. In this orientation of the two elements there is no flow path through the piston.

Conveniently, the two identical piston elements 18 and 19 are formed by molding techniques rather than by machining. For a heavy duty motor the two elements may be produced by powder metallurgy, preferably using a copper infiltrated high-strength alloy and heat treatment to provide effective physical properties; but it is to be understood that the invention is not dependent on the method employed in constructing the piston. It may be noted that making the piston of two axially separable elements permits the use of an integral, unsplit piston ring 24, since such a piston ring can be positioned as the two elements are brought together by axial movement.

The primary function of the bosses 26 and 27 is to locate the two elements in one or another of the possible positions of relative orientation about the common axis. A single properly positioned boss, or other provisions, could serve to accomplish that purpose; but I prefer to employ one boss for each of the through passages so that when the two elements are relatively oriented to provide no flow path through the piston each through passage will receive a boss and will thus be more effectively occluded than if its inner end opened against the plane inner face of the other element.

I claim:

1. In a hydraulic motor comprising a cylinder having end heads, a piston reciprocable in the cylinder between said heads, and a piston rod on which the piston is rigidly mounted, said piston comprising two identical disk-like elements having interengaging inner faces, each of said elements being provided with a pair of through passages and, at its inner face, with a pair of axially projecting bosses and a pair of recesses each adapted to receive a boss on the other element, each of said passages being formed to provide a recessed, inwardly presented valve seat, said passages, bosses, and recesses being equally spaced from the element-axis and equally spaced about such axis and so arranged that the two elements, when coaxially disposed, can be brought together in either a first relative position wherein both bosses of each element are reecived in the recesses of the other element and the through passages are aligned to provide two flow paths through the piston, a second relative position wherein the two bosses of each element are received respectively in a recess and in a passage of the other element while the other passages of the elements are aligned to provide a single flow path through the piston, or a third relative position wherein both bosses of each element are received in the two passages of the other element and no flow-path through the piston exists, and a valve for each of the flow paths, said valve having a head and aligned stems projecting in opposite directions from said head, said valve being receivable in its flow path with the head axially movable between the valve seats of the passages constituting such flow path and with its stems projecting through such passages for engagement by the the cylinder heads at the limits of the stroke of the piston.

2. In a hydraulic motor comprising a cylinder having end heads, a piston reciprocable in the cylinder between said heads, and a piston rod on which the piston is rigidly mounted, said piston comprising two identical disk-like elements having interengaging inner faces, each of said elements being provided with a through passage and, at its inner face, with an axially projecting boss and a recess adapted to receive the boss of the other element, said passage being formed to provide a recessed inwardly presented valve seat, said passage, boss, and recess being equally spaced from the element axis and equally spaced about such axis and so arranged that the two elements, when coaxially disposed, can be brought together in either a first relative position wherein the boss of each element is received in the recess of the other element and the passages of the two elements are aligned to provide a flow path through the piston or in a second relative position wherein the boss of each element is received in and occludes the passage of the other element, and a valve for said flow path, said valve having a head and aligned stems projecting in opposite directions from said head, said valve being receivable in the flow path with the head axially movable between the valve seats of the passages constituting such flow path and with its stems projecting through such passages for engagement by the cylinder heads at the limits of the stroke of the piston.

3. In a piston for use in a hydraulic motor, two identical disk-like elements having interengaging inner faces, each of said elements being provided with a pair of through passages and, at its inner face, with a pair of axially projecting bosses and a pair of recesses each adapted to receive a boss on the other element, each of said passages being formed to provide a recessed, inwardly presented valve seat, said passages, bosses, and recesses being equally spaced from the element-axis and equally spaced about such axis and so arranged that the two elements when coaxially disposed, can be brought together in either a first relative position wherein both bosses of each element are received in the recesses of the other element and the through passages are aligned to provide two flow paths through the piston, a second relative position wherein the two bosses of each element are received respectively in a recess and in a passage of the other element while the other passages of the elements are aligned to provide a single flow path through the piston, or a third relative position wherein both bosses of each element are received in the two passages of the other element and no flow-path through the piston exists, and a valve for each of the flow paths, said valve having a head and aligned stems projecting in opposite directions from said head, said valve being receivable in its flow path with the head axially movable between the valve seats of the passages constituting such flow path and with its stems projecting through such passages and beyond the outer piston faces.

4. In a piston for use in a hydraulic motor, two identical disk-like elements having interengaging inner faces, each of said elements being provided with a through passage and, at its inner face, with an axially projecting boss and a recess adapted to receive the boss on the other element, said passage being formed to provide a recessed, inwardly presented valve seat, said passage, boss, and recess being equally spaced from the element-axis and equally spaced about such axis and so arranged that the two elements, when coaxially disposed, can be brought together in either a first relative position wherein the boss of each element is received in the recess of the other element and the through passages are aligned to provide a flow path through the piston or in a second relative position wherein the boss of each element is received in and occludes the passage of the other element and a valve for said flow path, said valve having a head and aligned stems projecting in opposite directions from said head, said valve being receivable in the flow path with the head axially movable between the valve seats of the passages constituting such flow path and with its stems projecting through such passages and beyond the outer piston faces.

5. In a piston for use in a hydraulic motor, two coaxial disk-like elements having interengaging inner faces and each provided with a through passage having an intermediately located, inwardly presented valve seat, said elements being provided on their inner faces with interfitting provisions adapted to locate the two elements relatively to each other about their common axis either in a first position wherein the passages of the two elements are angularly offset from each other or in a second position wherein the passages of the two elements are aligned to provide a flow path through the piston, and a valve for such flow path, said valve having a head receivable and movable between the valve seats of the elements and aligned stems projecting in opposite directions from said head to extend through said passages and beyond the outer faces of the piston, each of said elements having a portion which occludes and prevents flow through the passage of the other element when the two elements are in said first position.

6. A piston as set forth in claim 5 with the addition that each of said elements is provided at its inner face with a peripheral rabbet groove, and a piston ring in said grooves.

7. A disk-like element adapted to be assembled in opposed, coaxial relation with an identical element to form a hydraulic-motor piston, said element having a central opening for reception of a piston rod, said element also having, at equal distances from the element axis and at 60° intervals in succession about such axis, a first through passage, a second through passage, a first boss, a second boss, a first recess, and a second boss, said bosses and recesses all being provided at a first face of said element and having substantially the same diameter, said passages being enlarged at and adjacent said first face to the diameter of the bosses and recesses and to a depth at least equal to the height of the bosses and being provided beyond their enlarged portions with valve seats.

8. A disk-like element adapted to be assembled in opposed, coaxial relation with an identical element to form a hydraulic-motor piston, said element having a central opening for reception of a piston rod and also having, at equal distances from the element axis and at 120° intervals in succession about such axis, a through passage, a boss, and a recess, said boss and recess being provided at a first face of said element and having substantially the same diameter, said passage being enlarged at and adjacent said first face to the diameter of the boss and to a depth at least equal to the height of the boss and being provided with a valve seat beyond its enlarged portion.

References Cited by the Examiner
UNITED STATES PATENTS

| | | | |
|---|---|---|---|
| 561,747 | 6/96 | Worthington | 91—422 |
| 841,527 | 1/07 | Imler | 91—422 |
| 2,902,007 | 9/59 | Rockwell | 91—401 |
| 3,059,622 | 10/62 | Sexauer | 91—401 |

FRED E. ENGELTHALER, *Primary Examiner.*